Figure 1:
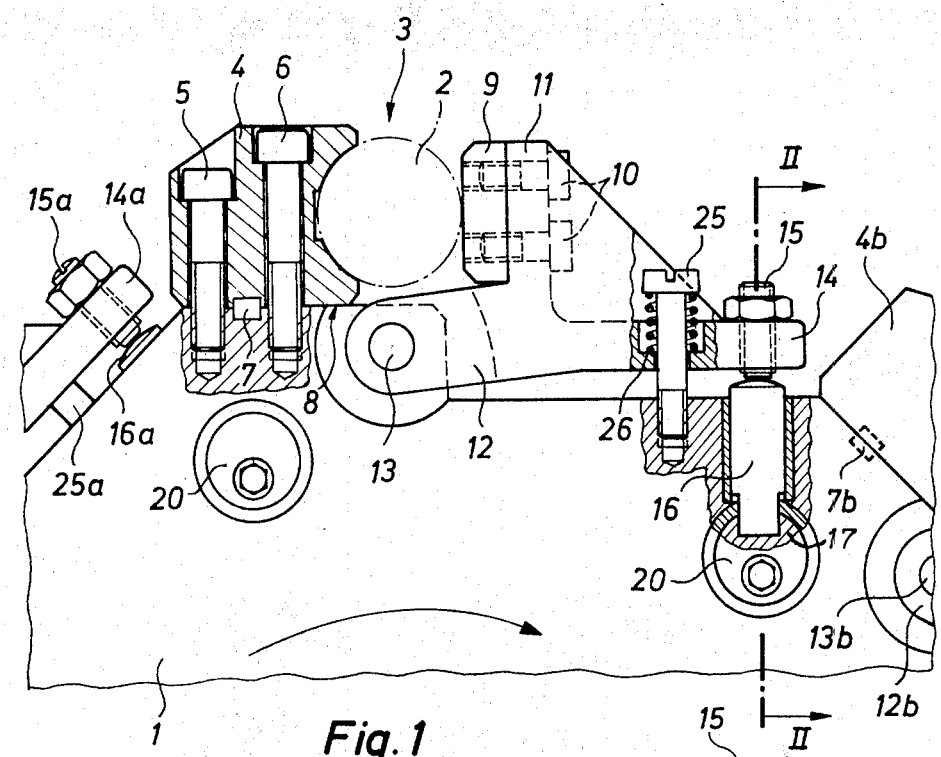

United States Patent [19]
Rolke et al.

[11] 3,802,688
[45] Apr. 9, 1974

[54] WORK PIECE HOLDING DEVICE

[75] Inventors: Eckehard Herbert Rolke; Werner Sonnek, both of Reichenbach/Fils, Germany

[73] Assignee: Traub GmbH, Reichenbach/Fils, Germany

[22] Filed: June 15, 1972

[21] Appl. No.: 262,977

[30] Foreign Application Priority Data
July 10, 1971 Germany.............................. 2134487

[52] U.S. Cl..................... 269/57, 269/234, 269/237
[51] Int. Cl........................... B25b 1/04, B25b 1/08
[58] Field of Search....... 269/57, 58, 138, 157, 160, 269/172, 217, 234, 237; 198/210; 408/43, 44, 71; 29/38 C

[56] References Cited
UNITED STATES PATENTS
1,740,934  12/1929  Raymond........................... 269/234
2,472,022  5/1949  Neal................................... 269/157
1,438,250  12/1922  Lyon................................... 269/234
2,337,528  12/1943  Stuckert............................. 51/134

Primary Examiner—Al Lawrence Smith
Assistant Examiner—Robert C. Watson
Attorney, Agent, or Firm—Roylance, Abrams, Berdo & Kaul

[57] ABSTRACT

A work piece holding device for the face plate of a machine tool which device includes a fixed jaw and a movable jaw. The movable jaw is pivotally mounted on the face plate and is moved towards and away from the fixed jaw by means of a wedge, the movement of the wedge being effected by means such as a rod on the machine tool.

8 Claims, 2 Drawing Figures

WORK PIECE HOLDING DEVICE

This invention concerns a work piece holding device for a machine tool, and more particularly it concerns a work piece holding device having one stationary holding jaw and one movable holding jaw, to be mounted on the face plate of a multi spindle lathe or like machine. The object of the present invention is to provide a work piece holding device, whose movable parts are mounted on a face plate.

Accordingly the present invention provides a workpiece holding device for a machine tool including a face plate, a fixed jaw, a holding lever including a movable jaw wherein the holding lever is pivotally mounted on the face plate, a wedge shaped member carried by the face plate and spring means for urging the holding lever towards the wedge-shaped member. Hence the invention provides a light-weight holding device of high holding power whose holding jaws may be changed. The holding device can be used for various work pieces.

According to a preferred embodiment of the device the wedge shaped member is of generally cylindrical form having a flat wedging surface provided thereon, the wedge shaped member being mounted on the face plate for axial displacement parallel to the pivotal axis of the holding lever. The wedge shaped member can be mounted in a simple manner on the face plate. With a relatively thin face plate having a wedge shaped member displaceable parallel to its axis, a hollow tube or pipe can be used for supporting the wedge shaped member.

The flat wedging surface is preferably the bottom surface of a groove or recess on the wedge shaped member into which one end of a transmission member is received, the transmission member being in contacting relationship with the holding lever. A further transverse groove is also provided in the wedge shaped member to receive an operating member for causing axial displacement of the wedge shaped member relative to the face plate. The transmission member by fitting into the groove in the wedge shaped member prevents axial rotation of the wedge shaped member. A connection is provided between an operating member and the wedge shaped member which is also capable of being effected between the operating member and the wedge shaped members of other work-piece holding devices. For example one operating member may act successively on several work-piece holding devices mounted on one face plate of a machine tool.

Figure 2:
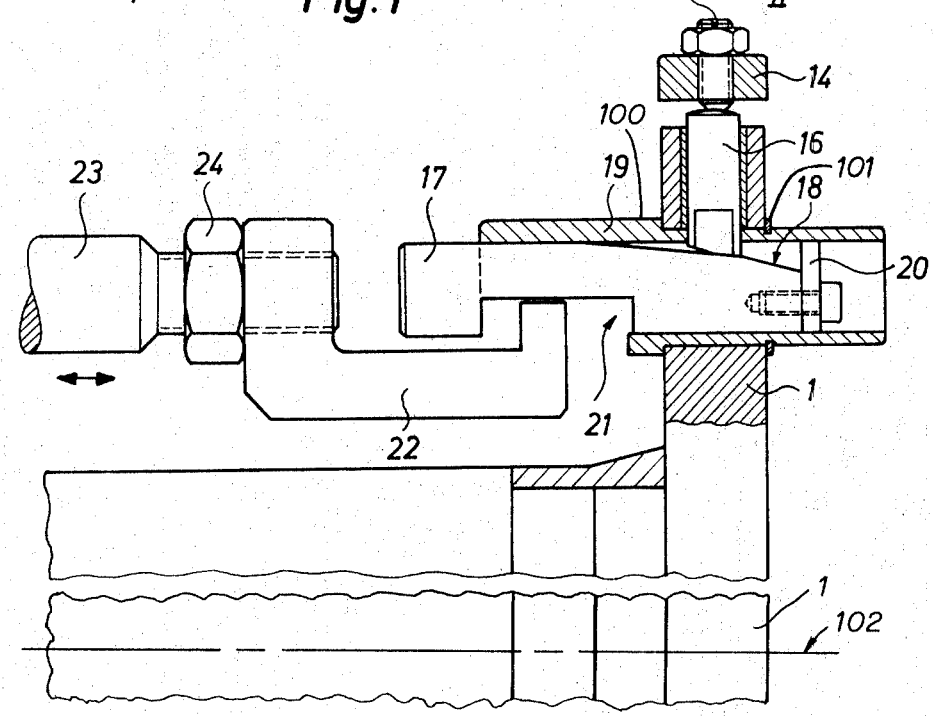

A specific embodiment of the invention will now be described by way of example with reference to the accompanying drawing in which:

FIG. 1 is a front elevation in section of a part of the face plate of a machine tool and FIG. 2 is a section along line II—II in FIG. 1.

Referring to FIG. 1 a plurality, for example eight, workpiece holding devices 3 are arranged in even spaced relationship on the periphery of a face plate 1 of a machine tool (not shown), for machining work pieces 2. The drawing only shows one workpiece holding device in full and parts of adjacent devices.

Each workpiece holding device 3 has a stationary holding jaw 4 which is releasably mounted by means of two screws 5 and 6 on flat surface 8 at the peripheral edge of the face plate 1.

For securing the jaw 4 in its correct position on the face plate 1 key 7 is located in grooves formed on the mating surfaces of the face plate 1 and the holding jaw 4.

A movable holding jaw 9 is releasably secured by means of screws 10 on a T-shaped tension lever or holding lever 11 of which a fork-shaped shank 12 is pivotally mounted on a corner part of the face plate 1 by means of a bolt 13 fixed to the face plate with its axis parallel to the axis 102 of said face plate and perpendicular to the plane containing the major surface of the face plate as seen in FIG. 1.

A positioning screw 15 is mounted on a shank 14, of the lever 11, remote from the bolt 13. The screw 15 can be locked in a predetermined disposition by a nut and co-operates with a cylindrical transmission member 16 which is axially displaceable along a line parallel to the plane containing the major surface of the face plate 1.

The end of member 16 remote from screw 15 is formed with flat parallel faces, said faces being received in a groove in a wedge shaped member 17. The bottom surface 18 of the groove is downwardly inclined to form a wedge as shown in FIG. 2, the end of member 16 remote from screw 15 being correspondingly inclined and resting on said bottom surface 18.

The connection between the transmission member 16 and the wedge shaped member 17 prevents axial rotation of the wedge shaped member. The wedge shaped member 17 is mounted in a pipe 19, which is arranged in the face plate with its axis parallel to the axis of the plate 1 and to the axis of the bolt 13. The pipe 19 is secured in position by means of a collar 100 and a spring washer 101. A disc-shaped stop piece 20 is secured on the wedge shaped member 17 by means of a screw. Movement of the wedge piece 17 towards the left as viewed in FIG. 2 is limited by engagement of the stop piece 20 on the member 16.

The wedge shaped member 17 has on the end remote from the stop piece 20, a transverse groove or slot 21, wherein one end of a C-shaped connection member 22 engages with considerable clearance. The connection member 22 is secured on a bar 23 arranged co-axially with the wedge shaped member 17 on a stationary part of the multi-spindle lathe, the bar 23 being adapted to be displaced axially. The part of the connection member 22 engaging the transverse groove 21 is adapted to displace the wedge shaped member 17 in the axial direction of bar 23. As described below, it is possible to provide the part of the connection member 22 in the transverse groove 21 with a movement to displace the wedge shaped member 17.

The play between the part of the connection member 22 engaging the transverse groove 21 and the latter and the distance between the wedge shaped member 17 and the part of the connection member 22 arranged co-axial thereto is so selected that this connection member is capable of being coupled with different forms of wedge shaped member 17 which may be provided, there being a wedge piece for each of the work piece holding devices on the face plate.

In the present embodiment by way of example only, only one connection member 22 with bar 23 is provided for eight work piece holding devices.

The connection member 22 screwed onto the bar 23 is held in position by a locking nut 24. For displacement of the wedge shaped member 17 to the right in FIG. 2 and thereby to close the jaws 4,9, a bar (not shown) subject to the action of a spring is arranged axially parallel to the bar 23 at a distance apart corresponding to at least one division. The bar is adapted to be displaced by means of a cam drive under the power of the spring in an abrupt or sudden manner.

A headed screw 25 is screwed into the switch plate 1 through a recess in the shank 14 of the lever 11. A coil spring 26 is yoked between the head of the screw 25 and the base of the recess in the lever 11, the said spring 26 encircling the shaft of the headed screw 26 and urging the positioning screw 15 against the transmission member 16 and, hence, the latter against the bottom surface 18 of the wedge shaped member 17.

Parts of the workpiece holding device arranged on the left of FIG. 1 are provided with the same reference numbers as in the workpiece holding device just described except that the letter *a* is added. The letter *b* is added to reference numbers of parts of the holding device shown on the right of FIG. 1.

Thus, as described in detail above, a plurality of work piece holding devices are mounted on a face plate which can be rotated about an axis and which is mounted on a multi-spindle machine. Each spindle on the machine will perform a certain machining operation on each workpiece held by the face plate and each spindle is located on the machine at a fixed position adjacent the periphery of the face plate. By rotating the face plate, the work pieces held thereby are moved successively to each spindle. In order to open and close each work piece holding device for the reception and removal of a work piece from each holding device, the bar 23 and C-shaped connection member 23 are mounted to the machine body adjacent the face plate.

Thus, in operation, when one work piece holding device 3 is moved to a position where it is adjacent the C-shaped connection member 22, member 22 is moved to the left as seen in FIG. 2. This opens the jaws 4 and 9 for the removal of a work piece 2 and the reception of a new work piece. Then member 22 is moved to the right as seen in FIG. 2 to close jaws 4 and 9 thereby securely positioning the new work piece there between. The face plate is then rotated so that the work holding device moves to a new position adjacent one of the spindles and the next work holding device on the face plate comes to rest adjacent connection member 22 with the transverse slot 21 surrounding the end of that member.

What is claimed is:

1. In a multi-spindle machine having a rotatable face plate supporting a plurality of work pieces thereon, the improvement comprising:
   a plurality of work piece holding devices mounted on the outside periphery of said face plate, said work piece holding devices being equally arcuately spaced around said periphery;
   each of said work piece holding devices including
   a fixed gripping jaw rigidly mounted to said face plate,
   a jaw lever pivotally mounted to said face plate along an axis parallel to the rotational axis of said plate, and
   a movable gripping jaw carried by said jaw lever, the axis of said jaw lever lying between said jaws;
   spring means connected to said jaw lever and said face plate for biasing said jaw lever towards said face plate, and thereby biasing said movable gripping jaw in a direction away from said fixed gripping jaw; and
   means for pivoting said movable gripping jaw of each of said plurality of work piece holding devices towards said fixed gripping jaw to engage a work piece there between, and away from said fixed gripping jaw to release a work piece;
   said means for pivoting including a wedge shaped member coupled to said face plate for movement relative thereto in a direction parallel to the axis of rotation of said face plate and coupled to said jaw lever, said wedge shaped member having a transverse slot therein, and
   a connection member having a portion fitting into said wedge shaped member, said connection member being mounted to the machine for movement in a direction parallel to the axis of rotation of said face plate.

2. The improvement according to claim 1, wherein said wedge shaped member has a groove therein, and said means for pivoting further includes
   a transmission member mounted on said face plate for movement relative thereto, one end of said transmission member contacting the bottom of said jaw lever and the other end of said transmission member fitting into and being supported on the bottom surface of said groove in said wedge shaped member.

3. The improvement according to claim 2, wherein said wedge shaped member is of generally cylindrical form.

4. The improvement according to claim 1, wherein said connection member is C-shaped and is connected to a bar.

5. The improvement according to claim 1, wherein said spring means includes a headed screw extending through a bore in said jaw lever and fitting into a threaded bore in said face plate, and a spring located around said screw between the screw head and the jaw lever.

6. The improvement according to claim 2, further including adjustable position means, coupled to said jaw lever, for positioning said jaw lever relative to said face plate, said adjustable position means contacting said transmission member.

7. The improvement according to claim 1, wherein said jaw lever is of substantially T-shaped form and said movable gripping jaw is removably secured to one arm of said T-shaped lever.

8. The improvement according to claim 7, wherein said fixed gripping jaw is removably secured to said face plate.

* * * * *